United States Patent [19]

Furuyama

[11] Patent Number: 4,621,602
[45] Date of Patent: Nov. 11, 1986

[54] KNOCK CONTROL SYSTEM FOR AUTOMOTIVE ENGINES

[75] Inventor: Masaaki Furuyama, Hoya, Japan

[73] Assignee: Fuji Jukogyo Kabushiki Kaisha, Tokyo, Japan

[21] Appl. No.: 679,961

[22] Filed: Dec. 10, 1984

[30] Foreign Application Priority Data

Dec. 12, 1983 [JP] Japan ............... 58-234095

[51] Int. Cl.<sup>4</sup> .......................................... F02P 5/145
[52] U.S. Cl. ..................................................... 123/425
[58] Field of Search ........................... 123/425, 435

[56] References Cited

U.S. PATENT DOCUMENTS

| | | | |
|---|---|---|---|
| 4,320,729 | 3/1982 | Sawada et al. | 123/425 |
| 4,433,654 | 2/1984 | Yokooku | 123/425 |
| 4,495,918 | 1/1985 | Sugiura et al. | 123/425 |
| 4,558,674 | 12/1985 | Okado et al. | 123/425 |

FOREIGN PATENT DOCUMENTS 0047663  4/1981  Japan .
0053678  3/1983  Japan ................. 123/425
0122362  7/1983  Japan ................. 123/425
0135365  8/1983  Japan ................. 123/425
0000572  1/1984  Japan ................. 123/425

*Primary Examiner*—Willis R. Wolfe, Jr.
*Attorney, Agent, or Firm*—Martin A. Farber

[57] ABSTRACT

A knock control system for an automotive engine having a knock sensor for sensing the vibration of the engine, and a knock control unit responsive to an output signal of the knock sensor for retarding the ignition timing. The system is provided with a fail-safe circuit which produces a fail-safe signal for retarding the ignition timing upon the fault of the knock sensor, and an exhaust gas temperature sensor for producing a temperature signal when the exhaust gas temperature exceeds a predetermined temperature. A correcting circuit is provided to be responsive to the temperature signal for reducing the retardation degree determined by the fail-safe signal and a switching circuit further reduces the retardation degree when the engine rpm is greater than a predetermined value.

7 Claims, 4 Drawing Figures

KNOCK CONTROL SYSTEM FOR AUTOMOTIVE ENGINES

BACKGROUND OF THE INVENTION

The present invention relates to a knocking control system for preventing knocking of an automotive engine which is provided with a fail-safe system, and more particularly to a system capable of preventing damage due to high exhaust gas temperature which is caused by keeping the ignition timing retardation at a full extent by the function of fail-safe system in case of malfunction of a knock sensor.

Knock control systems are usually mounted within an ignition timing control system with a distributor and have the function of electrically processing a signal from the knock sensor to detect the occurrence of knocking. When the system determines that knocking of the engine occurs, it acts to retard the ignition timing to a maximum extent so that knocking does not occur.

Japanese Patent Laid-Open No. 56-47663 disclosed a fail-safe system which operates to hold the ignition timing to the maximum retard when a knock sensor malfunctions because of reasons such as: faulty contacts of connectors; electrical release; short circuit, etc.

However, if the engine operates at an extremely retarded ignition timing, the amount of CO in the exhaust gases increases due to incomplete combustion. A large amount of CO is treated by oxidation in an exhaust gas purification system mounted on the vehicle, resulting in elevation of the exhaust gas temperature which causes damage in the exhaust system.

SUMMARY OF THE INVENTION

It is an object of the present invention to provide a knocking control system for an automotive engine, which is capable of preventing heat damage in an exhaust system, by controlling the ignition timing so as to prevent elevation of the exhaust gas temperature.

For this purpose, an exhaust gas temperature sensor is provided in an exhaust system of an engine to control the degree of retardation or advancement of ignition timing which is set by the signal from a fail-safe circuit, in response to the exhaust gas temperature.

According to the present invention there is provided a knock control system for an automotive engine, of the type having a knock sensor for sensing the vibration of the engine, a knock control unit comprising a knock detecting circuit responsive to an output signal of the knock sensor for producing a knock signal, a retard signal generating circuit responsive to the knock signal for producing a retard signal to retard the ignition timing, a fail-safe circuit which produces large retard signal for greatly retarding the ignition timing upon fault of the knock sensor, and an ignition system. The system comprises an exhaust gas temperature sensor for producing a temperature signal when the exhaust gas temperature exceeds a predetermined temperature, and a correcting circuit responsive to the temperature signal for reducing the retardation degree of the ignition timing. The large retard system further comprises an engine speed detecting circuit for producing an engine speed signal when engine speed exceeds a predetermined value, and a switching circuit responsive to the engine speed signal to further reduce the retardation degree. Further according to a feature of the invention the engine speed detecting circuit comprises a F/V converter for converting ignition pulses of the engine to voltage and a comparator to compare the voltage with a reference value to produce the engine speed signal, and the switching circuit comprises a transistor responsive to the engine speed signal and a resistor connected to the transistor in series.

The other objects and features of this invention will be apparently understood from the following description with reference to the accompanying drawings.

DETAILED DESCRIPTION OF THE PREFERRED EMBODIMENTS

Figure 1:
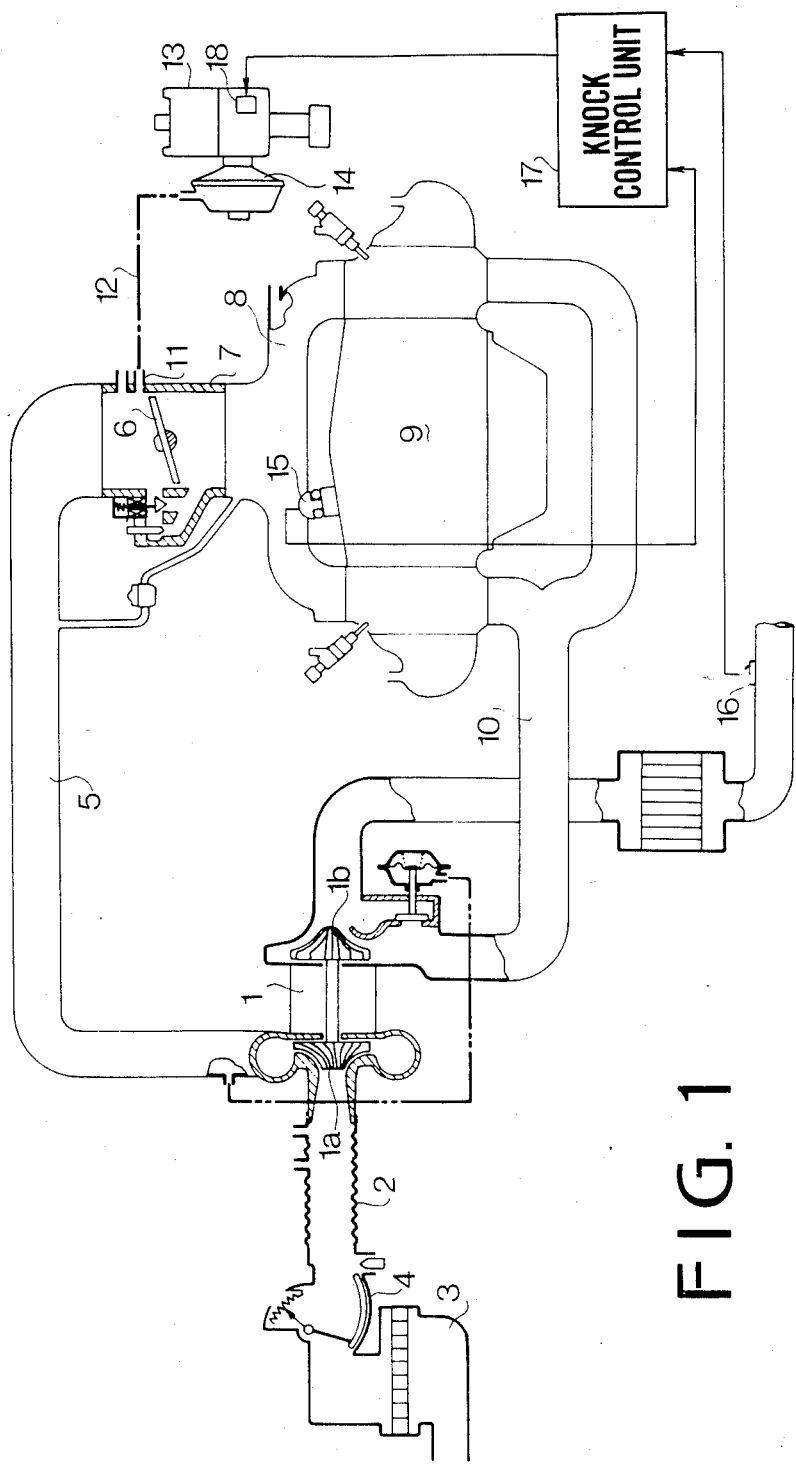
FIG. 1 is a schematic view showing an embodiment of a system according to the present invention.

Referring to FIG. 1, a supercharger 1 is provided in an engine 9. The supercharger 1 comprises a compressor 1a and a turbine 1b. The compressor 1a communicates at its intake side with an airflow meter 4 through a duct 2 and further with an air cleaner 3, and at its exhaust side communicates with cylinders in engine 9 through an intake pipe 5, throttle body 7 having a throttle valve 6 therein, and an intake manifold 8. The turbine 1b of the supercharger 1 is also communicated with the engine 9 through an exhaust pipe 10, so that the supercharger 1 is driven by exhaust gases when the revolution of the engine exceeds a predetermined value.

Further, a port 11 is provided at a position which is just upstream of the throttle valve 6 when the throttle valve 6 is fully closed but which is downstream of the valve 6 when the valve opens more than a predetermined degree. The port 11 communicates with a vacuum-advance device 14 through a passage 12. A knock sensor 15 is provided on the engine 9 to detect the vibration thereof and an exhaust gas temperature sensor 16 is provided on the exhaust system. Both sensors 15 and 16 are electrically connected to a knock control unit 17 which produces a retardation degree signal and sends it to an ignition system 18 in a distributor 13 to control ignition timing of the engine.

Figure 2:
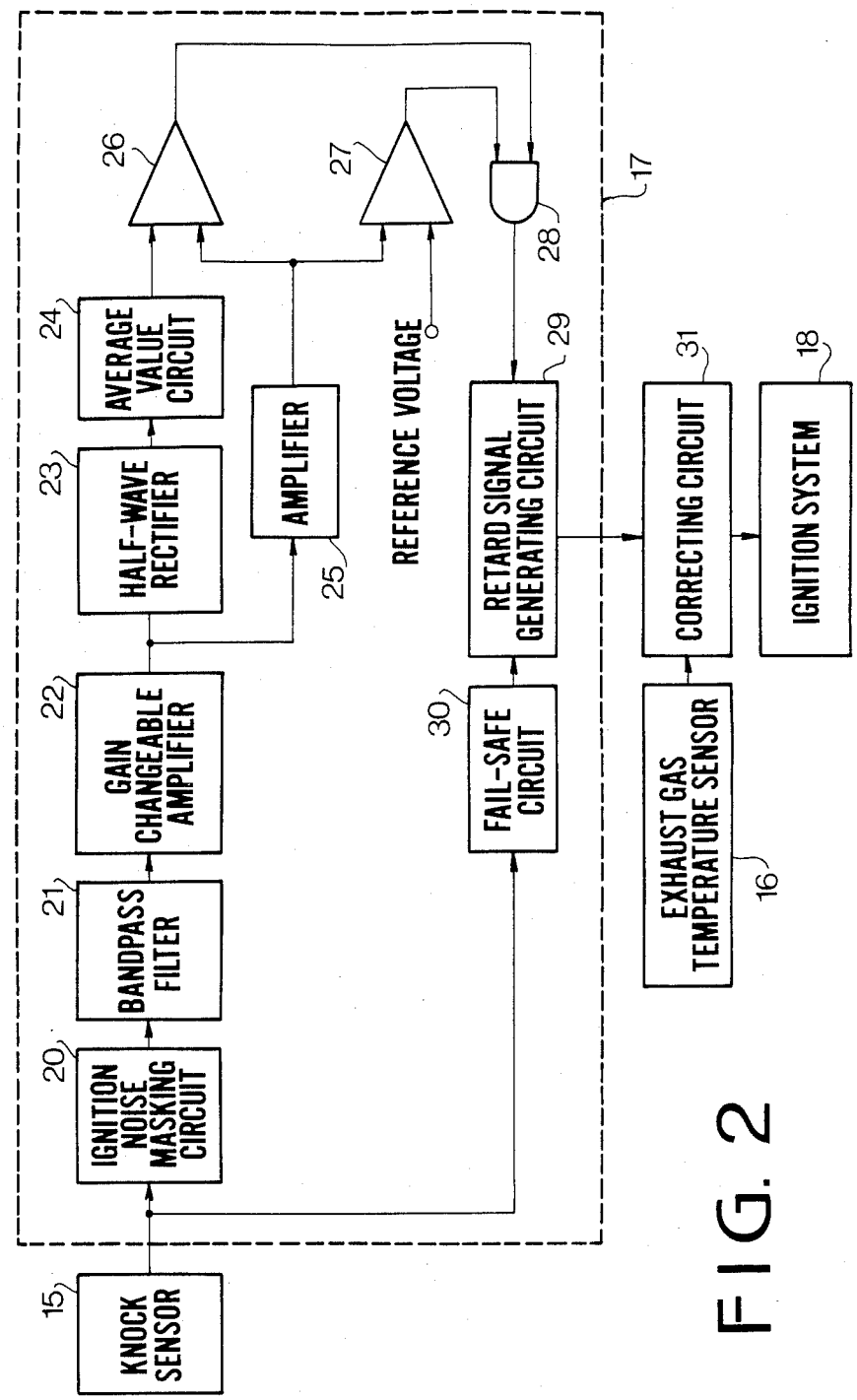
FIG. 2 is a block diagram of a control system.

Referring to FIG. 2, the knock control unit 17 comprises: an ignition noise masking circuit 20 for preventing the detection of ignition noise that is noise caused by ignition for distinguishing the output signal of the knock sensor 15 from this noise; a bandpass filter 21 through which alternating currents having frequencies within a knocking frequency band are transmitted; a gain changeable amplifier 22 for amplifying the amplitude of the detected signal within a low engine speed range to the same amplitude of as that in a high engine speed range in order to be able to detect the knocking in the low engine speed range; a half-wave rectifier 23 for picking up only pulses; an average value circuit 24 for controlling the signal of large amplitude to a predetermined level; an amplifier 25; a comparator 26 for comparing the level of output signal from the amplifier 25 with the average level of engine vibration from the average value circuit 24 to produce a H-level output signal when the former is higher, which means knocking occurs. The control unit 17 further comprises a comparator 27 for comparing the output signal from the amplifier 25 with a reference voltage in order to prevent misjudgement by signals other than knocking signals, which occur because the amplitude of the signal in the low engine range is amplified by the gain changeable amplifier 22; an AND gate 28 which produces a knock signal when both outputs from the comparators 26 and 27 are at high levels; a retard signal generating circuit 29 responsive to the knock signal to generate a retard signal voltage; and a fail-safe circuit 30 which produces a fail-safe signal for causing the retard signal generating circuit 29 to produce a signal representing a maximum retardation in case of receiving no signal from the knock sensor 15. In this knock control system, a correcting circuit 31 is applied with output signals of the exhaust gas temperature sensor 16 and the retard signal generating circuit 29 to produce a retard control signal.

Figure 3:
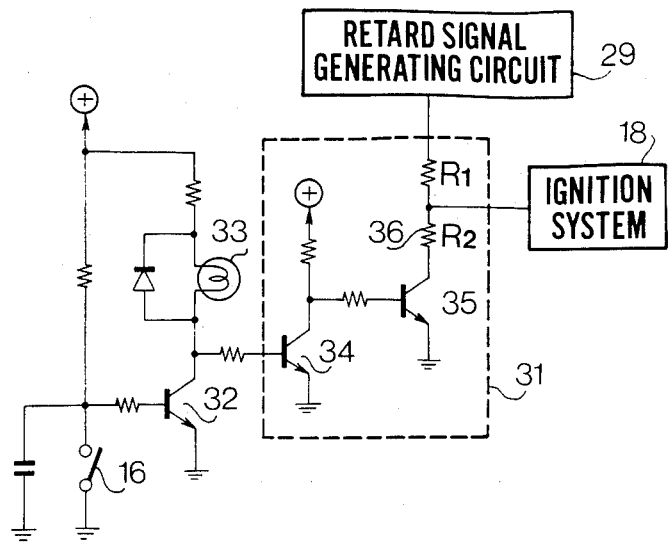
FIG. 3 shows a circuit of a main part of the control system.

The exhaust temperature sensor 16 and the correction circuit 31 are hereinafter explained in detail referring to FIG. 3. The exhaust temperature sensor 16 is turned on at a normal temperature to cut off a transistor 32, and turned off at an abnormally high temperature to turn on the transistor 32 to light up a warning lamp 33. The collector of the transistor 32 is connected to a base of a transistor 34 in the correction circuit 31, and the collector of the transistor 34 is connected to a base of a transistor 35. A voltage divider 36 and the transistor 35 are connected between the retard signal generating circuit 29 and the ground in series. The voltage divider 36 is connected to the ignition system 18 at the juncture between resistors $R_1$ and $R_2$.

In operation, the knock sensor 15 continuously detects the engine vibration while the vehicle is driven, and the knock control unit 17 determines whether knocking exists or not. When no knocking is detected, the level of the signal voltage from the circuit 29 in the knock control system is at a predetermined standard value, whereby the ignition system 18 acts to control the ignition timing to advance according to the throttle position. When knocking of the engine is detected, the retard signal generating circuit 29 produces a retard signal in response to the knock signal from AND gate 28, so that the ignition system 18 controls the retardation of ignition timing to a degree corresponding to the retardation signal. Further, when the knock sensor 15 is out of order, the fail-safe circuit 30 generates a fail-safe signal which causes the circuit 29 to produce a signal representing a maximum retardation degree.

While the fail-safe circuit 30 provides the ignition timing at a maximum retardation at a normal exhaust gas temperature, the exhaust gas temperature sensor 16 is turned on and the transistor 32 is turned off, thereby turning on the transistor 34 and hence turning off transistor 35. Thus, the signal from the retard signal generating circuit 29 is applied as it is to the ignition system 18, providing a maximum retardation. On the other hand, if the exhaust gas temperature elevates abnormally, the exhaust gas temperature sensor 16 is turned off and the transistor 32 turns on, to light up the warning lamp 33. Accordingly, the transistor 34 is turned off to turn on the transistor 35. Thus, the voltage at the voltage divider 36 is applied to the ignition system 18, so that the retardation degree is reduced by the voltage determined by the voltage divider ration $R_2/(R_1 + R_2)$.

Figure 4:
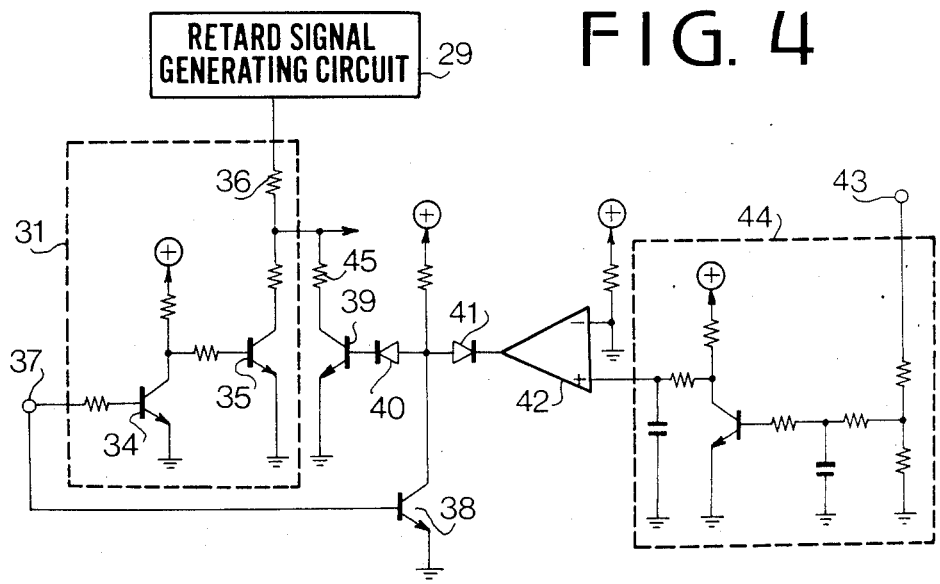
FIG. 4 is a circuit of a main of a system according to another embodiment.

In another embodiment of the present invention shown in FIG. 4, an input terminal 37 for the transistor 34 in the correcting circuit 31 is connected to a base of a transistor 38. The emitter of the transistor 38 is grounded and the collector is applied with a fixed voltage and is connected to a base of a transistor 39 through a diode 40. The collector of the transistor 39 is connected to the juncture of the voltage divider 36 through a resistor 45. On the other hand, an input terminal 43 of an F/V converter 44 is applied with ignition pulses which are converted to voltage. The output of the F/V converter is connected to a comparator 42 the output of which is connected to the emitter of the transistor 38.

When the exhaust temperature becomes excessively high, the exhaust gas temperature sensor 16 (not shown in FIG. 4) opens, causing the voltage at the terminal 37 to go to a low level, and turning on the transistor 35 to correct the retardation of the ignition timing as described above. In such a condition, the transistor 38 is turned off to make a condition under which a regular voltage is applied to the base of the transistor 39. In case of low engine speed, because the output voltage of the F/V converter 44 is lower than the reference voltage for the comparator 42, the output of the comparator 42 is at a low level. Accordingly, the current from the source passes through the diode 41, turning off the transistor 39 to send the voltage at the voltage divider 36 to the ignition system 18. On the other hand, when the engine speed is higher than the predetermined value, the output of the comparator 42 becomes high to turn on the transistor 39. Thus, the voltage applied to the ignition system 18 further drops by the resistor 45 connected in parallel to the voltage divider 36, so that the degree of retardation is reduced with increase of the engine speed.

There are, of course, other measures to correct the maximum retardation than the above mentioned systems.

From the foregoing, it will be understood that the present invention provides a knock control system which enables correction of retardation degree in case of malfunction of a knock sensor, and avoids damage in the exhaust system caused by the abnormally hot exhaust gases.

While the presently preferred embodiments of the present invention has been shown and described, it is to be understood that this disclosure is for the purpose of illustration and that various changes and modifications may be made without departing from the spirit and scope of the invention as set forth in the appended claims.

What is claimed is:

1. An improved knock control system for an automotive engine, of the type having an ignition system, a knock sensor for sensing vibration of the engine, a knock control unit comprising a knock detecting circuit responsive to an output signal of the knock sensor for producing a knock signal, a retard signal generating circuit responsive to the knock signal for producing a retard signal to retard ignition timing of the ignition system, a fail-safe circuit which producs a fail-safe signal for retarding the ignition timing at fault of the knock sensor, wherein the improvement comprises:

an exhaust gas temperature sensor for producing a temperature signal when the exhaust gas temperature exceeds a predetermined temperature;

a correcting circuit responsive to the retard signal, fail-safe signal and the temperature signal for producing a correction signal which is applied to the ignition system to control the ignition timing, the correction circuit being so arranged to respond to the temperature signal to reduce the retardation degree decided by the fail-safe signal;

an engine speed detecting circuit for producing an engine speed signal when engine speed exceeds a predetermined value; and a switching circuit responsive to the engine speed signal to further reduce the retardation degree decided by the fail-safe signal;

the engine speed detecting circuit comprises an F/V converter for converting ignition pulses of the engine to voltage and a comparator to compare the voltage with a reference value to produce the engine speed signal, and the switching circuit comprises a transistor responsive to the engine speed signal and a resistor connected to the transistor in series.

2. A knock control system for an automotive engine comprising:

an ignition system;

knock sensor means for sensing internal vibration of the engine;

a knock control unit comprising a knock detecting circuit means for discriminating an output signal of the knock sensor means dependent on knocking from signals dependent on other vibration for producing a knock signal;

retard signal generating circuit means responsive to the knock signal for producing a retard signal to retard ignition timing of the ignition system;

fail-safe circuit means for producing a fail-safe signal for causing the retard signal generating circuit means to produce a large retard signal for greatly retarding the ignition timing upon fault of the knock sensor means;

an exhaust gas temperature sensor means for producing a temperature signal when the exhaust gas temperature exceeds a predetermined temperature;

correcting circuit means responsive to said temperature signal for producing a retard control signal to reduce the degree of retardation of the ignition timing determined by the large retard signal;

engine speed detecting circuit means for producing an engine speed signal when engine speed exceeds a predetermined value; and switching circuit means responsive to the engine speed signal to further reduce the retardation degree determined by the large retard signal.

3. The knock control system according to claim 2 wherein the correcting circuit means comprises a voltage divider for applying a voltage to the ignition system, and at least one transistor responsive to the temperature signal for varying the voltage applied from the voltage divider to the ignition system.

4. A knock control system for an automotive engine comprising:

an ignition system means for providing ignition timing;

knock means for detecting internal vibration of the engine;

retard means responsive to the knock means for retarding the ignition timing of the ignition system means upon occurrence of said the internal vibration of the engine;

fail-safe means for retarding the ignition timimg of the ignition system means upon fault of the knock means;

an exhaust gas temperature means for producing a temperature signal when exhaust gas temperature exceeds a predetermined temperature;

correcting means responsive to said temperature signal for reducing the degree of retardation of the ignition timing determined by the fail-safe means and the retard means, respectively;

engine speed detecting means for producing an engine speed signal when engine speed exceeds a predetermined value; and switching means responsive to the engine speed signal to reduce the retardation degree of the ignition timing determined by the correcting means in response to said temperature signal.

5. The knock control system according to claim 4, wherein said switching means being non-responsive to said engine speed signal so as not to reduce the retardation degree of the ignition timing determined by the fail-safe means and the retard means, respectively when said exhaust gas temperature means does not produce said temperature signal when said exhaust gas temperature does not exceed said predetermined temperature.

6. A knock control system for an automotive engine comprising:

an ignition system means for providing ignition timing;

knock means for detecting internal vibration of the engine;

retard means responsive to the knock means for retarding the ignition timing of the ignition system means upon occurrence of said the internal vibration of the engine;

fail-safe means for retarding the ignition timing of the ignition system means upon fault of the knock means;

engine speed detecting means for producing an engine speed signal when engine speed exceeds a predetermined value; and switching means responsive to the engine speed signal to reduce the retardation degree of the ignition timing determined by the fail-safe means and the retard means, respectively.

7. The knock control system according to claim 6, wherein said switching means includes means including a first transistor responsive to said engine speed signal to effect the reducing of the retardation degree and a second transistor operatively controlled by exhaust gas temperature, said second transistor has an emitter-collector path connected between ground and a voltage source, and oppositely poled diodes connected between said engine speed detecting means and said first transistor and connected at a junction to said emitter-collector path.

* * * * *